United States Patent
Robins (10) Patent No.: US 10,464,467 B2
(45) Date of Patent: Nov. 5, 2019

(54) STABILIZED ATTACHMENT ASSEMBLY AND RATCHET LOAD BINDER USING THE SAME

(71) Applicant: Terry K. Robins, Minneapolis, KS (US)

(72) Inventor: Terry K. Robins, Minneapolis, KS (US)

(*) Notice: Subject to any disclaimer, the term of this patent is extended or adjusted under 35 U.S.C. 154(b) by 289 days.

(21) Appl. No.: 15/632,582

(22) Filed: Jun. 26, 2017

(65) Prior Publication Data
US 2019/0031079 A1    Jan. 31, 2019

Related U.S. Application Data

(60) Provisional application No. 62/495,318, filed on Sep. 12, 2016.

(51) Int. Cl.
| | |
|---|---|
| *B60P 7/08* | (2006.01) |
| *B60P 7/15* | (2006.01) |
| *F16G 11/12* | (2006.01) |
| *B63B 25/24* | (2006.01) |
| *B21F 9/00* | (2006.01) |

(52) U.S. Cl.
CPC ............. *B60P 7/083* (2013.01); *B60P 7/0853* (2013.01); *B60P 7/15* (2013.01); *B63B 25/24* (2013.01); *F16G 11/12* (2013.01); *B21F 9/002* (2013.01)

(58) Field of Classification Search
CPC ........... B60P 7/083; B60P 7/0853; B60P 7/15; B63B 25/54; F16G 3/006; F16G 11/12; B21F 9/002
See application file for complete search history.

(56) References Cited

U.S. PATENT DOCUMENTS

| | | | | |
|---|---|---|---|---|
| 1,037,615 | A * | 9/1912 | Grenier | F16G 3/006 |
| | | | | 254/232 |
| 3,065,007 | A * | 11/1962 | Colmer, Jr. | F16G 11/12 |
| | | | | 24/279 |
| 3,338,359 | A * | 8/1967 | Baillie | B60P 7/083 |
| | | | | 192/43.1 |
| 4,052,027 | A * | 10/1977 | Taylor | B63B 25/28 |
| | | | | 248/499 |
| 5,611,521 | A * | 3/1997 | Grover | B25B 21/002 |
| | | | | 254/235 |
| 5,911,409 | A * | 6/1999 | Grover | B25B 21/002 |
| | | | | 254/234 |
| 6,945,516 | B1 | 9/2005 | Scott et al. | |

(Continued)

*Primary Examiner* — Michael E Gallion
(74) *Attorney, Agent, or Firm* — Brinks Gilson & Lione (57) ABSTRACT

A stabilized attachment assembly (200) and ratchet load binder (100) using the stabilized attachment assembly (200) is provided. The stabilized attachment assembly (200) includes an attachment member (230) to which a lever arm (250) is coupled. The ratchet load binder (100) includes a tubular member (110) rotatably driven by a ratchet handle assembly (120). The attachment assembly (200) is threadedly engaged in one open end (116) of the tubular member (110) and an attachment member (130) is threadedly engaged in an opposing open end (116) of tubular member (110) and both are linearly displaced towards or away from one another responsive to rotation of the tubular member (110) in a particular direction. A user holds the lever arm (250) in one hand while reciprocally operating the ratchet handle assembly (120) with another hand.

21 Claims, 6 Drawing Sheets

(56) References Cited

U.S. PATENT DOCUMENTS

| | | | |
|---|---|---|---|
| 7,055,804 B2* | 6/2006 | Scott | B60P 7/083 |
| | | | 254/231 |
| 7,229,065 B2 | 6/2007 | Scott et al. | |
| 7,552,913 B1* | 6/2009 | Amoss | F16G 11/12 |
| | | | 254/233 |
| 8,851,255 B2 | 10/2014 | Mitchell | |
| 9,039,055 B1* | 5/2015 | Robins | F16B 45/02 |
| | | | 294/82.17 |
| 9,453,557 B2* | 9/2016 | Chou | F16G 11/12 |
| 10,038,313 B2* | 7/2018 | Howell | H02G 1/04 |
| 2008/0118324 A1* | 5/2008 | Fritel | F16G 11/12 |
| | | | 410/100 |
| 2011/0000317 A1* | 1/2011 | Ruan | B60P 7/083 |
| | | | 73/862.42 |
| 2011/0176884 A1* | 7/2011 | Ruan | B25B 13/48 |
| | | | 410/103 |
| 2014/0326935 A1* | 11/2014 | Chao | B60P 7/083 |
| | | | 254/235 |
| 2016/0195165 A1* | 7/2016 | Chou | F16G 11/12 |
| | | | 74/88 |
| 2017/0232881 A1* | 8/2017 | Thompson | B60P 7/0853 |
| | | | 254/229 |
| 2017/0355298 A1* | 12/2017 | Cahall | F16H 57/021 |
| 2018/0187441 A1* | 7/2018 | Underwood | B60P 7/0861 |
| 2018/0319311 A1* | 11/2018 | Chao | B60P 7/083 |

\* cited by examiner

STABILIZED ATTACHMENT ASSEMBLY AND RATCHET LOAD BINDER USING THE SAME

CROSS-REFERENCE TO RELATED APPLICATIONS

This application claims the benefit of U.S. provisional patent application 62/495,318, filed Sep. 12, 2016. All subject matter set forth in Provisional Application Ser. No. 62/495,318 is hereby incorporated by reference into the present application as if fully set forth herein.

BACKGROUND OF THE INVENTION

It has long been common to secure a load on transport vehicles such as flatbed trucks, trailers or railcars with chains that are wrapped around the entire load or coupled to it. A load binder has opposing ends with hooks that are hooked into two spaced apart chain links of a pair of chains, one going to or around the load and the other being coupled to the transport vehicle. The load binder is a device that draws the hooked links toward one another to tighten the chain and may include a latch mechanism that secures the chain in the tightened condition.

An early version of such a load binder is referred to as a lever binder and is still in current use. The lever binder uses an over-center mechanism to draw the chain links together by a fixed amount. The lever is pivoted using brute force to drive the lever to an over-center position and in the process draws the chain ends together by the fixed amount. No incremental adjustments are available. Not only is the tightening effect limited to the fixed draw length, but the substantial amount of energy that is stored in the stretching of the chain by such over-center tightening can cause kickback of the operating lever that has been known to result in serious injury or even death to the user of the device.

As an alternative, a ratchet load binder has come into use. Ratchet load binders are generally known in the hauling industry to be a safer option to that of lever binders. The ratchet load binder provides continuous incremental adjustment to tighten the chains to which it is connected and likewise gradually releases the energy stored in a tightened chain and does not produce kickback. Ratchet load binders have a tubular body with left and right hand threads at the opposing ends of the tubular body and corresponding threaded shaft portions of a pair of eye bolts or hook bolts threadedly engaged in the ends of the tubular body so as to move into and out from the tubular body responsive to rotation of the tubular body relative to the pair of eye bolts or hook bolts. Rotation of the tubular body is achieved by a ratchet mechanism having a pawl connected to a ratchet handle and a ratcheting spur gear attached to the tubular body. The ratchet handle is reciprocated back and forth to turn the tubular body relative to the threaded shaft portions which draws the threaded shafts into or out from the tubular body and thereby achieves tightening or loosening of the chain connected thereto.

While the ratchet load binder is safer to use than the lever binder, it does have drawbacks, one of which is the tendency of the one eye bolt/hook bolt coupled to the longest length of chain to rotate along with the rotation of the tubular body. That rotation reduces the amount of threading or unthreading of the eye bolt or hook bolt relative to the threaded end of the tubular body and exposes the chain to torsion forces. To prevent that rotation, the uses is expected to stabilize that one eye bolt/hook bolt against rotation with one hand while operating the ratchet handle with the other. The stoppage of that rotation becomes more difficult with increasing tension applied to the chain and with eye bolts or hook bolts that have become rusted, fouled or have become damaged, as occurs under ordinary use. Since the use of one hand to prevent rotation of the one eye bolt/hook bolt is exceedingly difficult for the majority of users, users have resorted to the use of what is called "cheater bars," which are bars or tools such as tire irons, hammers or other such tools, that are inserted into the eye bolt or an adjoining link member between the eye bolt and a hook, to act as a lever and provide sufficient mechanical advantage to be held by the user to prevent rotation. Users have also been known to wedge such cheater bars against the flatbed of the transport vehicle to stop the rotation of the eye bolt/hook bolt. Use of such tools has created its own safety issue in that they are known to have become disengaged and strike the user.

Another drawback and safety issue of the currently available ratchet load binder has to do with the length of the threaded shaft portion that is initially extended from the threaded ends of the tube by the user when initially connecting the ratchet binder to the chains that are to be drawn together. The user does not have any way to judge how far a eye bolt/hook bolt can be unscrewed before there will be an insufficient threaded engagement with the tube.

There is, therefore, a need in the art for a ratchet load binder that can safely stabilize the attachment member (typically an eye bolt or hook bolt) that is connected to the longer length of chain securing a load. There is yet a further need for a ratchet type load binder that can indicate to the user the maximum length to which the attachment member can be unscrewed from the ends of the tube. The ratchet load binder and stabilized attachment assembly structure disclosed herein fulfills those needs, providing a solution to the drawbacks associated with prior art ratchet load binders.

SUMMARY OF THE INVENTION

A stabilized ratchet load binder is provided that includes a tubular member having internal threads disposed in each of a pair of opposing open ends and a ratchet spur gear affixed to the tubular member for rotation of the tubular member in correspondence with rotation of the tubular member. The stabilized ratchet load binder further includes a ratchet handle pivotally coupled to the tubular member and configured to engage the ratchet spur gear for rotation thereof in a selected one of two opposing directions responsive to a reciprocative displacement of the ratchet handle about a longitudinal axis of the tubular member. Further, the stabilized ratchet load binder includes a first attachment member having an axially extending threaded shaft portion disposed in one of the pair of opposing open ends of the tubular member and threadedly engaged with the internal threads thereof. Still further, the stabilized ratchet load binder includes an attachment assembly disposed in the other of the pair of opposing open ends of the tubular member. The attachment assembly includes a second attachment member having an axially extended threaded shaft portion threadedly engaged with the internal threads of the other of the pair of opposing open ends of the tubular member. The threaded shaft portion of the second attachment member and the internal threads of the other of the pair of opposing open ends of the tubular member are configured to provide linear displacement of second attachment member relative to the tubular member in common with the first attachment member. The attachment assembly further includes a lever arm coupled to the second attachment member and configured to be held by one hand while a user's other hand reciprocates the ratchet handle.

From another aspect, a stabilized attachment assembly of a ratchet load binder that includes a tubular member having internal threads disposed in each of a pair of opposing open ends, and is configured to be rotatably driven by a ratchet assembly is provided. The attachment assembly includes an attachment member having an axially extended threaded shaft portion disposed at one end of the attachment member and is threadedly engaged with the internal threads of one of the pair of opposing open ends of the tubular member, and a connecting portion disposed at an opposing end of the attachment member. Further, the attachment assembly includes a lever arm coupled to the attachment member and extending therefrom. The lever arm is configured to be grasped by a user while operating ratchet assembly.

DETAILED DESCRIPTION OF THE PREFERRED EMBODIMENTS

Referring to FIGS. 1-5, there is shown ratchet load binder 100 with a stabilized attachment assembly 200 providing an improved tensioning device for chains 10 and 14 used in load securement and tie down systems. As will be described in following paragraphs, ratchet load binder 100 allows a user 50 to control rotational force that is applied to the attachment assembly 200 by the rotation of the tubular member 110 of the ratchet load binder 100 by operation of the ratchet handle 122.

Figure 1:
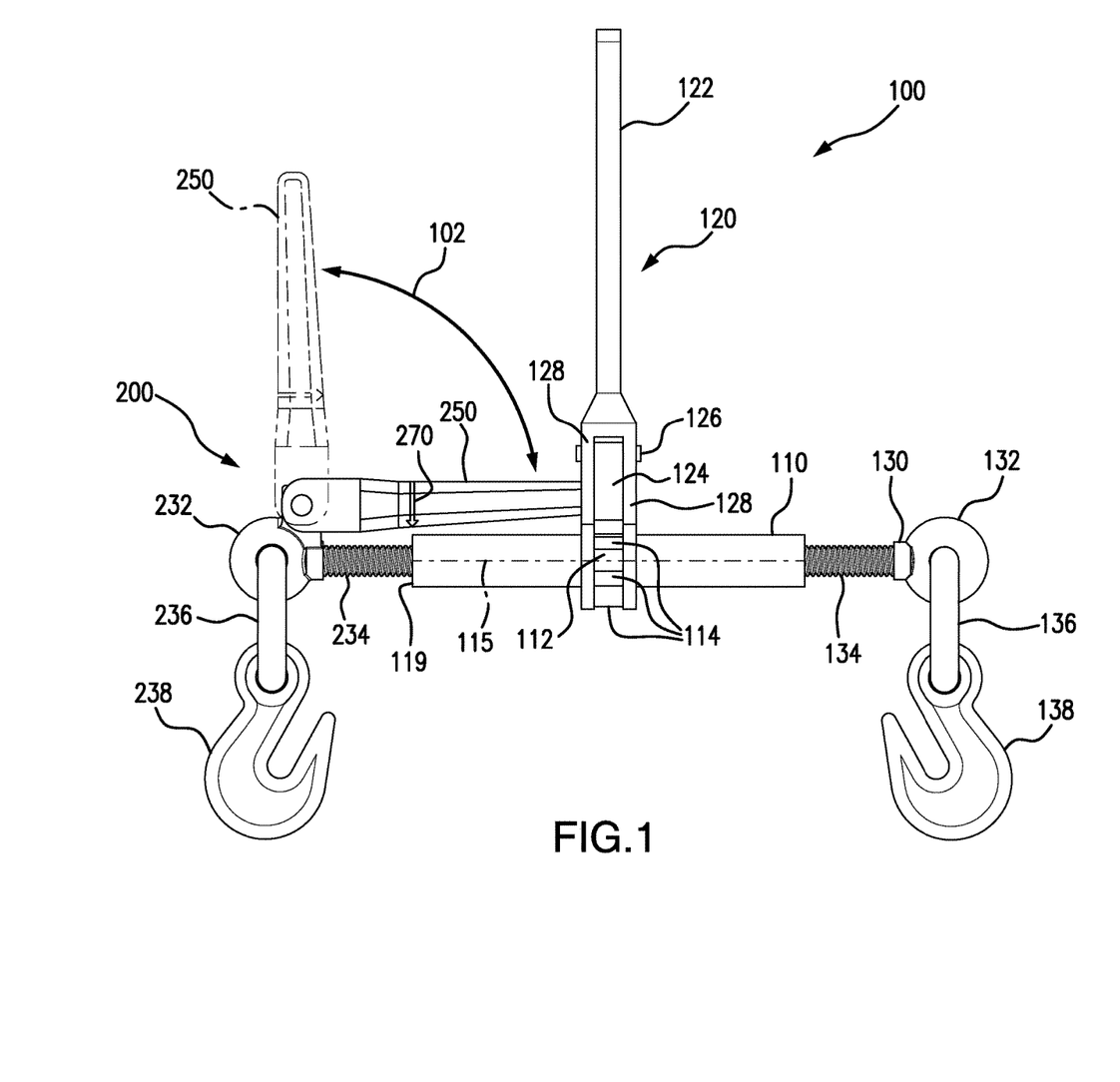
FIG. 1 is an elevation view of the ratchet load binder of the present invention in the extended position.
Figure 3:
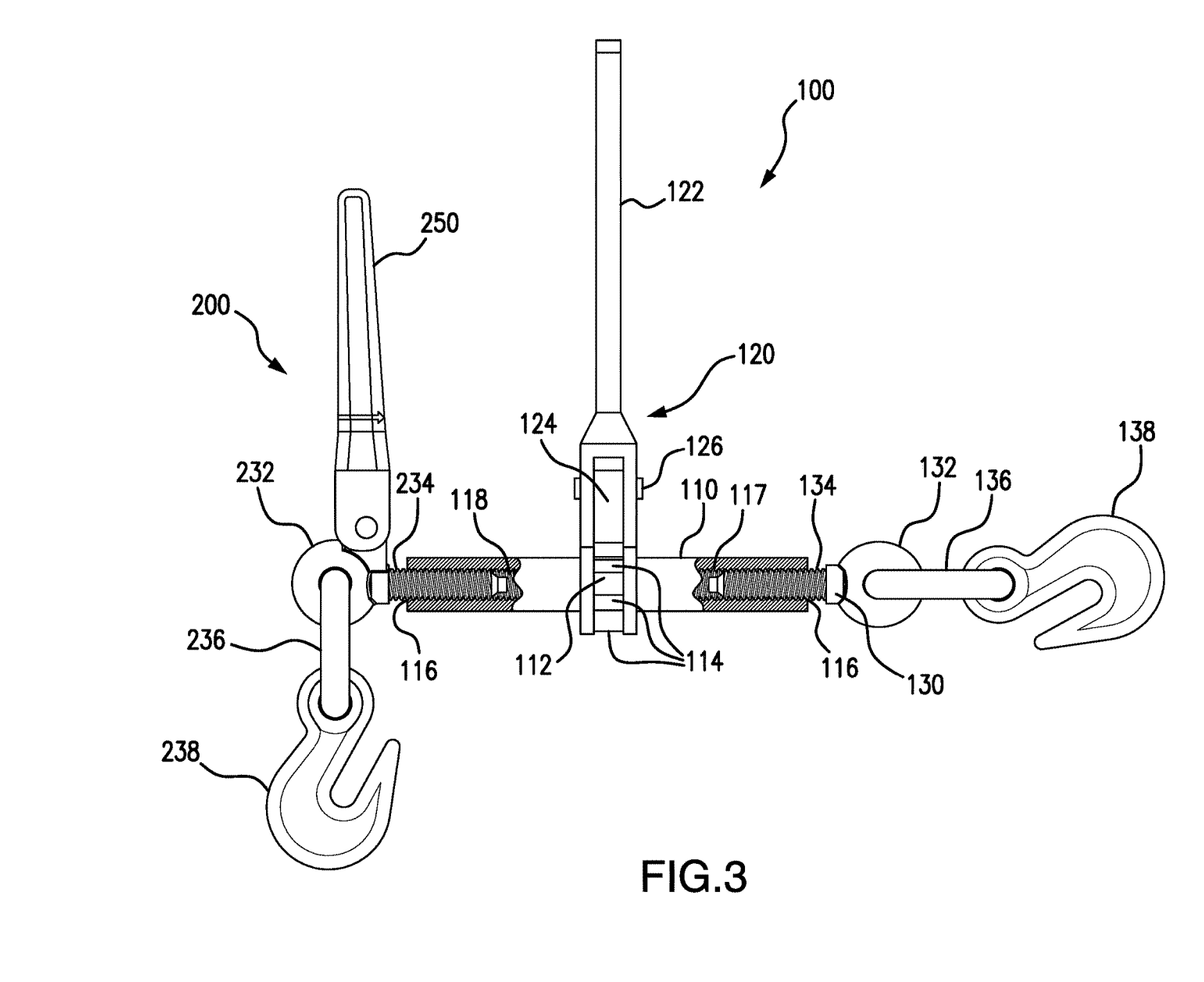
FIG. 3 is an elevation view of the ratchet load binder of the present invention, partially cut-away.

Referring specifically to FIGS. 1 and 3, there is shown ratchet load binder 100 which is typically used to tighten chains that secure loads to transporting vehicles. To that end, ratchet load binder 100 includes an attachment member 130 and an attachment assembly 200 respectively threadedly engaged in opposing open ends 116 of the longitudinally extended tubular member 110. Tubular member 110 has a ratchet spur gear 112 coupled thereto and disposed concentric to the longitudinal axis 115 of the tubular member 110. Ratchet spur gear 112 has a plurality of gear teeth 114 and may be mounted centrally with respect to the longitudinal extent of the tubular member 110 or adjacent an end portion thereof. The ratchet spur gear 112 is engaged by a double acting ratchet handle assembly 120 that is rotatably coupled to the tubular member 110 and is rotatable about the ratchet spur gear 112 to provide rotary motion to the tubular member 110.

Ratchet handle assembly 120 includes a ratchet handle 122 that extends transversely with respect to the axis 115 of tubular member 110, and a spring biased double acting pawl 124 pivotally coupled to the ratchet handle 122. The double acting pawl 124 is pivotally coupled to the ratchet handle 122 between a pair of arms 128 thereof by a pin, rivet or bolt 126 and spring biased by a compression spring and detent ball, as is typical (not shown). The ratchet handle 122, spring biased double acting pawl 124 and ratchet spur gear 112 together define the ratchet assembly of the ratchet load binder 100. The ratchet handle assembly 120 is conventional and is of the type commonly used in ratchet load binders and thereby well known in the art. Accordingly, the structure of ratchet handle assembly 120 need not be described in any greater detail than that provided above.

The tubular member 110 has internal threads 117, 118, respectively, in the open ends 116. The threads 117 and 118 may be acme or square threads, with one end having left hand threads 117, for example, and the opposing end having right hand threads. It is not important which end has the left handed or right handed threads, only that the opposing ends 116 have oppositely directed threads so that the attachment member 130 and attachment assembly 200 are linearly displaced relative to the tubular member in common, into or out from the open ends 116. The attachment member 130 and attachment assembly 200 are moved towards or away from one another by rotation of the tubular member 110 to tighten or loosen the chain securing a load to a vehicle, as a function of the direction of rotation of the tubular member 110.

The exemplary attachment member 130 shown in FIGS. 1 and 3-5 is shown as an eye bolt, to which a hook 138 is connected via a link 136. Alternately, a hook bolt or clevis jaw may be used in place of the combined eye bolt, link and hook. Attachment member 130 has an eye portion 132 having a substantially annular closed contour disposed at one end thereof. As a means for connection to a chain, the eye portion 132 is coupled to the hook 138 by the intervening link 136. The intervening link 136 can be eliminated by coupling a clevis type hook (not shown), shackle or the like, directly to the eye bolt. Attachment member 130 further has a longitudinally extended threaded shaft portion 134 at the opposing end thereof. The threads of the threaded shaft portion 134 are complementary to the threads 117 of the corresponding open end 116 into which it is engaged, with respect to the direction and type of threads.

Figure 2:
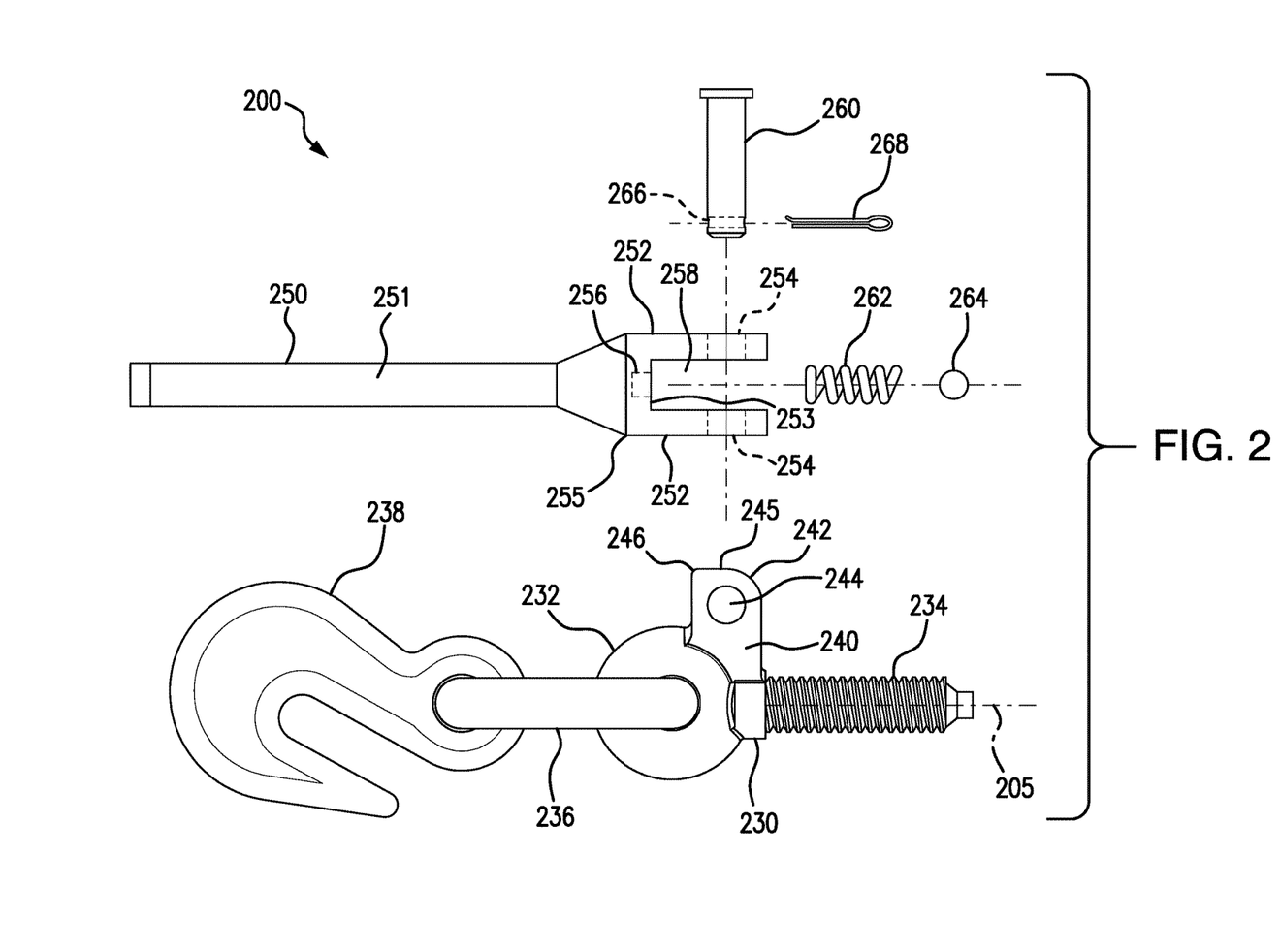
FIG. 2 is an exploded view of the stabilized attachment assembly of the present invention.

Referring additionally to FIG. 2, there is shown, an exploded view of attachment assembly 200. Attachment assembly 200 includes an attachment member 230 and a lever arm 250 coupled to the attachment member 230. Attachment member 230 is illustrated as an eye bolt to which a hook 238 is connected through an intervening link 236. As in the attachment member 130, a hook bolt or clevis jaw may be used in place of the combined eye bolt, link and hook. Attachment member 230 has an eye portion 232 having a substantially annular closed contour disposed at one end thereof. As a means for connection to a chain, the eye portion 232 is coupled to the hook 238 by the intervening link 236. Hereto, the intervening link 236 can be eliminated by coupling a clevis type hook (not shown), shackle or the like, directly to the eye portion 232. Attachment member 230 has a longitudinal axis 205 and an axially extended threaded shaft portion 234 at the opposing end thereof. The threads of the threaded shaft portion 234 are complementary to the threads 118 of the corresponding open end 116 into which it is engaged, with respect to the direction and type of threads.

While the lever arm 250 may be coupled to attachment member 230 by other means, the exemplary attachment assembly 200 includes a protruding boss or tab 240 as an attachment site for lever arm 250. The protruding tab 240 can be forged, stamped, welded or otherwise mechanically attached to the attachment member 230. The protruding tab 240 may be affixed to the eye portion 232, as shown, or adjacent thereto and extend in a direction transverse to the longitudinal axis 205 of the attachment member 230. As shown, the lever arm 250 is coupled to the protruding tab 240, allowing a user to hold the lever arm 250 with one hand while using their other hand to operate the ratchet handle 122. The lever arm 250 is formed of a material having sufficient size and strength for the purpose to which it is employed in ratchet load binder 100. While lever arm 250 may be fixedly attached to protruding tab 240, or alternately directly affixing the lever arm 250 to the attachment member 230 or integrally forming it therewith, thereby eliminating the protruding tab 240, it is believed that greater utilitarian value is achieved with lever arm 250 being reconfigurablely coupled to the protruding tab 240, as by a pivotal coupling. The lever arm 250 may be reconfigurablely coupled to the attachment member 230 by being removably attached to the attachment member 230, which is configured so that the lever arm 250 can be selectively coupled to the attachment member 230 in one of multiple orientations. In this manner the lever arm 250 can be reconfigurable in, for example, either a use position substantially orthogonal to the longitudinal axis 115 of the tubular member 110, or a storage position substantially parallel to the longitudinal axis 115 of the tubular member 110. The lever arm 250 may be of a fixed length chosen to provide the necessary mechanical advantage required to stabilize the attachment assembly 200, and thereby the ratchet load binder 100, or an adjustable length lever arm attached to the attachment member 230.

For pivotal coupling of the lever arm 250, the protruding tab 240 may be configured with a pair of oppositely directed trunnion posts (not shown) or other means of pivotally attaching a lever arm or handle. The protrusion tab 240 may also have one or more holes, detents and/or grooves for the attachment and function of the lever arm 250 thereto with a pin, such as the pin 260, a bolt, a rivet, or other like means. In the exemplary attachment assembly 200, the protrusion tab 240 has a pivot hole 244 through which the pin 260 passes to pivotally secure the lever arm 250 to the protrusion tab 240. For attachment of lever arm 250 to protrusion tab 240, lever arm 250 has a coupling portion 255 at a distal end thereof with a handle portion 251 extending from the coupling portion 255. In the exemplary attachment assembly 200 shown in the FIGS. 2, 2A and 2B, the coupling portion 255 is bifurcated into a pair of leg portions 254, spaced from one another by a receiving space 258. A cavity 256 may be formed in an end wall 253 of the coupling portion 255 of lever arm 250 and is in open communication with the receiving space 258. The cavity 256 receives a detent spring 262 and a detent ball 264 therein.

The pair of leg portions 252 have respective aligned through holes 254 and align with the pivot hole 244 of protrusion tab 240 when received in the receiving space 258. The lever arm 250 is thereby pivotally coupled to the protrusion tab 240 by the pin 260 being passed through the pair of through holes 254 and the pivot hole 244. The pin 260 is secured by a cotter pin, such as the split pin 268, as is illustrated, or a hairpin cotter pin, or bowtie cotter pin or a like fastener passed through the cross hole 266 formed through the pin 260. A bolt, rivet or other shaft-like member may be substituted for pin 260 to provide a pivotal coupling between the leg portions 252 and the protrusion tab 240.

Figure 2A:
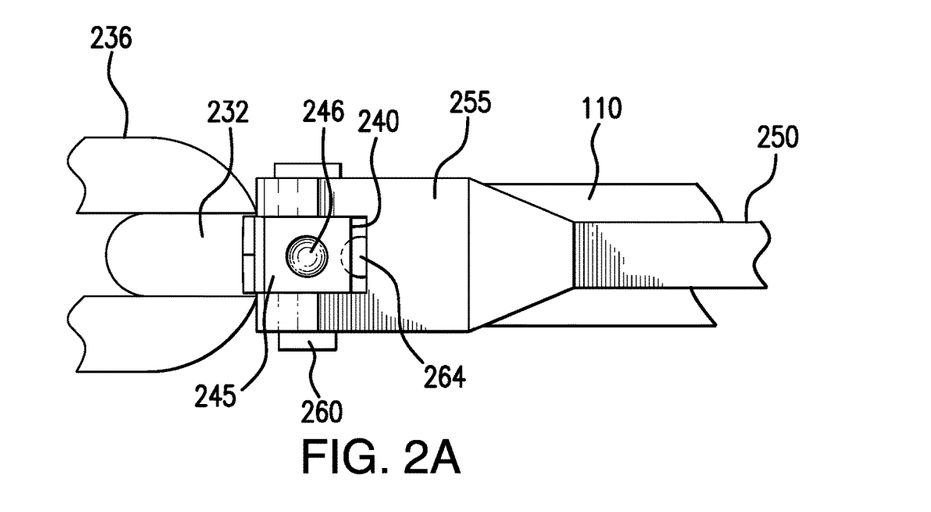
FIG. 2A is cut-away top view of the stabilized attachment assembly of the present invention.
Figure 2B:
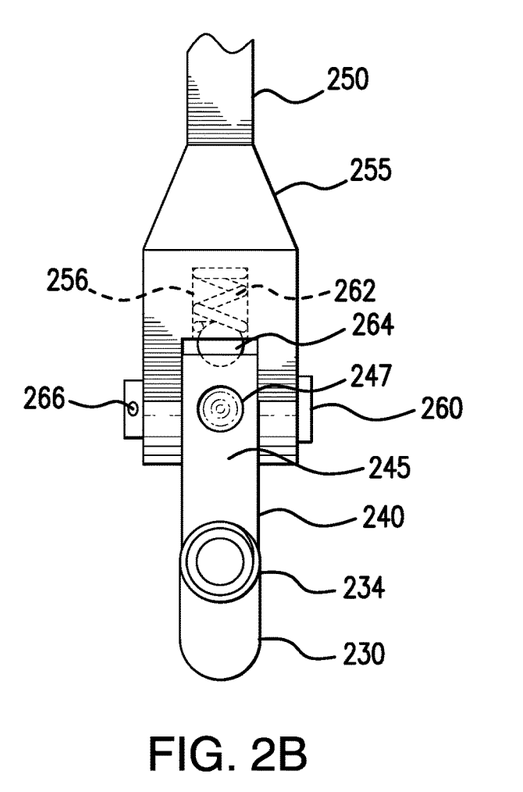
FIG. 2B is an elevation view of the stabilized attachment assembly of the present invention.

Protrusion tab 240 has an asymmetrical contour at the distal end thereof. The top corner 242 has a large radius, a radius that is sufficient to provide clearance between the end surface 245 of the protrusion tab 240 and the end wall 253 as the lever arm 250 is pivoted between positions substantially orthogonal to the longitudinal axis 205 of the attachment member 230 and substantially parallel thereto, as indicated by the directional arrow 102. The radiused corner 242 thereby facilitates the angular displacement of the of the lever arm 250 about the pin 260 in a direction toward the threaded shaft portion 234. The opposing top corner 246, adjacent the eye portion 232, has a substantially right angle contour and may have a small chamfered edge or small radiused edge. The substantially right angle contour of the top corner 246 acts to block pivotal displacement of the lever arm 250 in the direction of the eye portion 232, as the end surface 245 adjacent the top corner 246 contacts the end wall 253 when the lever arm 250 is moved toward the eye portion 232.

The end surface 245 of protrusion tab 240 may have at least one detent receiving recess 246, 247 formed therein to releasably hold the lever arm in a particular position with respect to the longitudinal axis 205 of the attachment member 230, which axis is coaxial with the longitudinal axis 115 of the tubular member 110. Thus, when the lever arm 250 is pivotally displaced to a position where the spring biased detent ball 264 is aligned with a detent receiving recess 246, 247, the spring bias force of spring 262 applied to detent ball 264 causes detent ball 264 to be partially inserted into the recess 246, 247. By that arrangement, the lever arm 250 is held in that position until sufficient displacement force is applied to the lever arm 250 to overcome the spring bias force applied to the detent ball 264 by the spring 262. A detent receiving recess 246 may be formed in the end surface 245 at a position between the top corners 242 and 246 to releasably hold the handle in an open position, an upright orientation that is substantially orthogonal to the longitudinal axis 115 of the of the tubular member 110. Alternately, or in addition to the detent receiving recess 246, a detent receiving recess 247 may be formed in end surface 245 on a side of the protrusion tab 240 facing the threaded shaft portion 234 to releasably hold the handle in a measurement/storage position, substantially parallel to the longitudinal axis 115 of the tubular member 110. Other tensioning means can be employed in place of the spring biased detent ball to releasably retain lever member 250 in desired positions or control the pivotal movement of the lever member 250.

Referring back to FIG. 1, a safety feature is shown in that the lever arm 250 can be provided with indicia 270. The indicia 270 may be stamped, inscribed, cast or otherwise permanently formed in or on the lever arm 250, or provided by a label or printed, painted or otherwise marked on lever arm 250. Indicia 270 may be represented by any symbol or geometric form useable as a reference mark to be aligned with the corresponding end edge 119 of tubular member 110. Alignment of indicia 270 with the end edge 119 of tubular member 110, when the lever arm 250 is in the measurement/storage position, indicates an extended length of attachment member 230 that still provides a safe minimum engagement of the threaded shaft portion 234 with the threads 118 formed in the corresponding open end 116 of tubular member 110. The extent that the exposed portion of the threaded shaft portion 234 extends from the end 119 of tubular member 110 provides a visual reference for comparison with the extent that the threaded shaft portion 134 of attachment member 130 is exposed from the opposing end of tubular member 110 to indicate its safe minimum engagement with the threads 117 formed in the corresponding open end 116 of tubular member 110.

Figure 5:
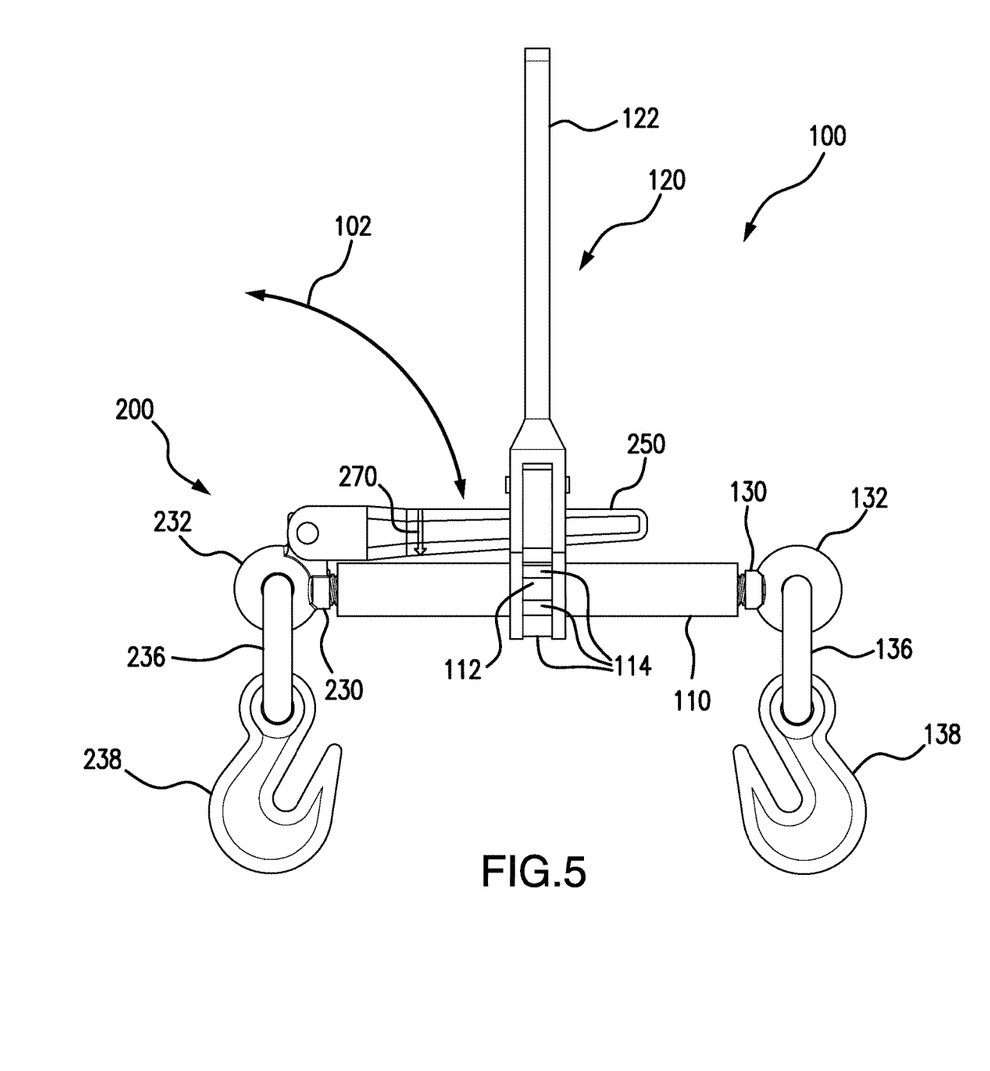
FIG. 5 is an elevation view of the ratchet load binder of the present invention in the retracted position.

For storage and as a further safety feature, as illustrated in FIG. 5, the attachment member 130 and attachment assembly 200 are each threaded a substantial amount into the respective open ends 116 of tubular member 110 and the lever arm 250 is rotated to the measurement/storage position, as indicated by the directional arrow 102. For storage, attachment member 130 and attachment assembly 200 would typically each be fully threaded into the respective open ends 116 of tubular member 110. The ability to rotate the lever arm 250 to the measurement/storage position convenient provides for storage of ratchet load binder 100 in essentially the same space as that used for storage of conventional ratchet load binders. With respect to safety, subsequent to the chain to which ratchet load binder 100 is coupled being tightened, the attachment assembly 200 is rotated relative to the tubular member 110 about the axis 205 to position the lever arm 250 adjacent to and aligned position with the ratchet handle 122, as shown in FIG. 1. The lever arm 250 is then rotated to the measurement/storage position. In the measurement/storage position, the lever arm 250 blocks the rotational movement of ratchet handle 122 and thereby serves as a rotational lock for ratchet load binder 100.

Figure 4:
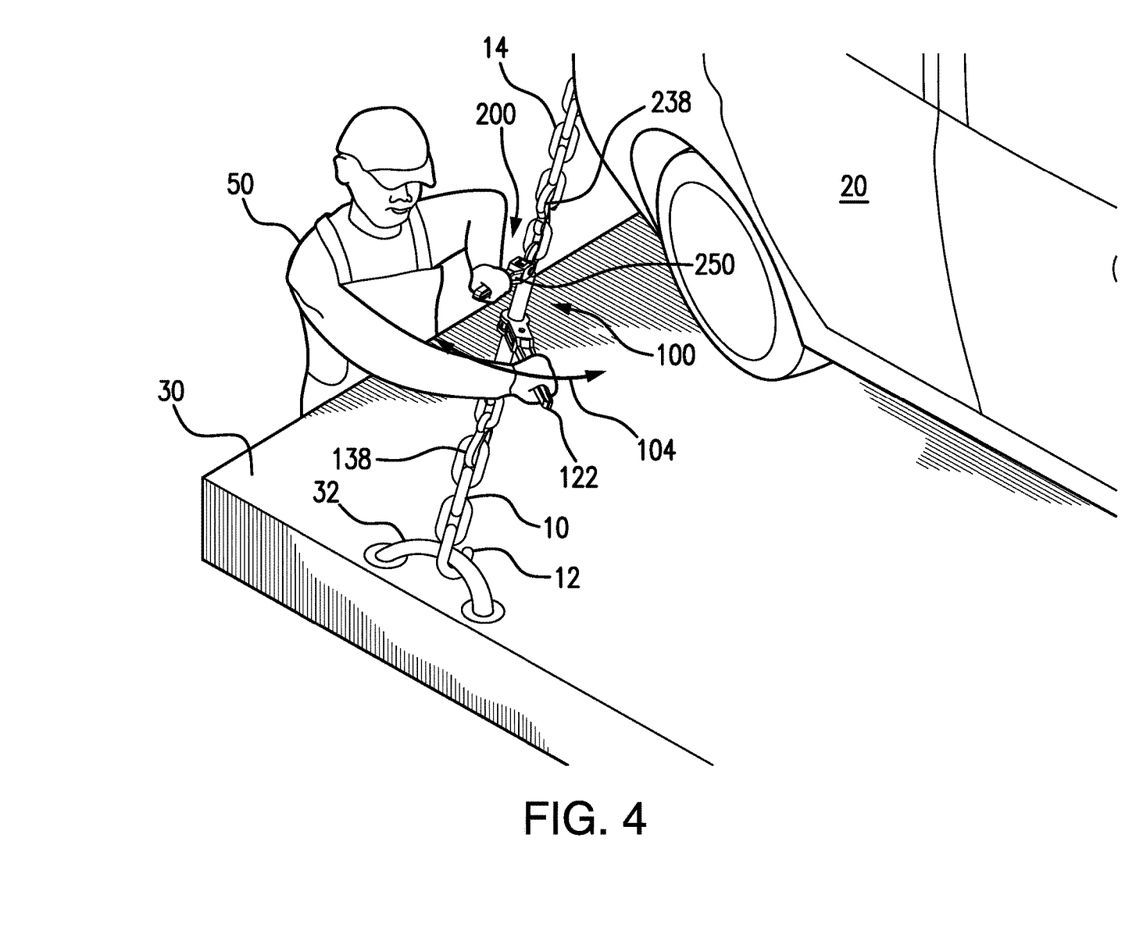
FIG. 4 is an illustration of the use of the present invention.

Referring specifically to FIGS. 1 and 4, an example of the use of ratchet load binder 100 is shown. Subsequent to the attachment member 130 and attachment assembly 200 being moved outward from the tubular member 110 while maintaining a safe minimum engagement of the threaded portions 134 and 234 thereof, as described above, ratchet load binder 100 is ready to be employed for tightening the chain 14 securing a load 20 to a transport vehicle 30. The hook 138, which may be a grab hook, is connected to the transport vehicle 30 by a short length of chain 10 and hook 12 that connects to an anchor point, such as the tie loop or strap 32. Transport vehicles may alternatively have lashing rings or tie down rails as anchor points to which the hook 12 connects or the chain 10 loops through with the hook 12 being connected to a link thereof. The hook 138 of ratchet load bonder 100 is connected to a link of the chain 10 and the load binder hook 238, which may be a grab hook, is connected to the chain 14 that extends to the load 20, illustrated as a vehicle, but may be any type load requiring the use of tie down chains.

When moving the attachment members 130 and 230 towards or away from each by the rotary motion of the tubular member 110, the attachment members 130 and 230 would tend to rotate with the tubular member 110, which tendency is increased with ordinary usage as the threads become rusted, fouled or damaged. The Attachment member 130 is stabilized against such rotation by the short length of chain 10 which has little torsional play. The attachment member 230 is stabilized against rotation by use of the lever arm 250, which by virtue of the long length of chain and being initially slack has significant torsional play and would otherwise rotate. The user 50 orients the lever arm in the open position and holds the lever arm 250 with one hand while reciprocatively operating the ratchet handle 122, as indicated by the directional arrow 104, with the user's other hand. In that manner, the user 50 is able to stabilize the attachment member 230 against rotation as the tubular member is rotated.

The descriptions above are intended to illustrate possible implementations of the present invention and are not restrictive. While this invention has been described in connection with specific forms and embodiments thereof, it will be appreciated that various modifications other than those discussed above may be resorted to without departing from the spirit or scope of the invention. Such variations, modifications, and alternatives will become apparent to the skilled artisan upon review of the disclosure. For example, functionally equivalent elements may be substituted for those specifically shown and described, and certain features may be used independently of other features, and in certain cases, particular locations of elements may be reversed or interposed, all without departing from the spirit or scope of the invention as defined in the appended Claims. The scope of the invention should therefore be determined with reference to the description above, the appended claims and drawings, along with their full range of equivalents.

What is being claimed is:

1. A stabilized ratchet load binder, comprising:
   a tubular member having internal threads disposed in each of a pair of opposing open ends and a ratchet spur gear affixed to the tubular member for rotation of the tubular member in correspondence with rotation thereof;
   a ratchet handle pivotally coupled to the tubular member and configured to engage the ratchet spur gear for rotation thereof in a selected one of two opposing directions responsive to a reciprocative displacement of the ratchet handle about a longitudinal axis of the tubular member;
   a first attachment member having an axially extending threaded shaft portion disposed in one of the pair of opposing open ends of the tubular member and threadedly engaged with the internal threads thereof; and
   an attachment assembly disposed in the other of the pair of opposing open ends of the tubular member, the attachment assembly including:
   a second attachment member having an axially extended threaded shaft portion threadedly engaged with the internal threads of the other of the pair of opposing open ends of the tubular member, the threaded shaft portion of the second attachment member and the internal threads of the other of the pair of opposing open ends of the tubular member being configured to provide linear displacement of the second attachment member relative to the tubular member in common with the first attachment member; and
   a lever arm coupled to the second attachment member and configured to be held by one hand while a user's other hand reciprocates the ratchet handle, wherein the second attachment member includes a protruding tab extending therefrom and the lever arm is pivotally coupled to the protruding tab.

2. The stabilized ratchet load binder as recited in claim 1, wherein the lever arm is reconfigurably coupled to the second attachment member.

3. The stabilized ratchet load binder as recited in claim 2, wherein the lever arm has indicia positioned thereon for indicating a maximum extension of the second attachment member with respect to the tubular member of the ratchet load binder when the lever arm is reconfigured to a position substantially parallel to the longitudinal axis of the tubular member.

4. The stabilized ratchet load binder as recited in claim 1, wherein the protruding tab has at least one detent opening formed therein and the lever arm includes a spring biased detent ball for releasable engagement with the at least one detent opening for releasably holding the lever arm in a predetermined position.

5. The stabilized ratchet load binder as recited in claim 1, wherein at least the second attachment member has an eye portion at one end thereof and the threaded shaft portion at an opposing end.

6. The stabilized ratchet load binder as recited in claim 5, wherein the eye portion of the second attachment member includes the protruding tab extending therefrom.

7. The stabilized ratchet load binder as recited in claim 1, wherein the lever arm is reconfigurably coupled to the protruding tab of the second attachment member.

8. A stabilized attachment assembly of a ratchet load binder including a tubular member having internal threads disposed in each of a pair of opposing open ends, the tubular member being configured to be rotatably driven by a ratchet assembly, the stabilized attachment assembly comprising:
   an attachment member including an axially extended threaded shaft portion disposed at one end of the attachment member and being threadedly engaged with the internal threads of one of the pair of opposing open ends of the tubular member, and a connecting portion disposed at an opposing end of the attachment member; and
   a lever arm coupled to the attachment member, the lever arm being configured to be grasped by a user while operating the ratchet assembly, wherein the attachment member includes a protruding tab extending therefrom and the lever arm is pivotally coupled to the protruding tab.

9. The stabilized attachment assembly as recited in claim 8, wherein the lever arm is reconfigurablely coupled to the attachment member.

10. The stabilized attachment assembly as recited in claim 9, wherein the lever arm has indicia positioned thereon for indicating a maximum extension of the attachment member with respect to the tubular member of the ratchet load binder when the lever arm is reconfigured to a position substantially parallel to a longitudinal axis of the tubular member.

11. The stabilized attachment assembly as recited in claim 8, wherein the lever arm is reconfigurablely coupled to the protruding tab of the attachment member.

12. The stabilized attachment assembly as recited in claim 8, wherein the connecting portion has an annular closed contour.

13. The stabilized attachment assembly as recited in claim 12, wherein the protruding tab is coupled to at least the connecting portion and extending therefrom.

14. The stabilized attachment assembly as recited in claim 13, wherein the lever arm is reconfigurablely coupled to the protruding tab.

15. The stabilized attachment assembly as recited in claim 8, wherein the protruding tab has at least one detent opening formed therein and the lever arm includes a spring biased detent ball for releasable engagement with the at least one detent opening for releasably holding the lever arm in a predetermined position.

16. A stabilized ratchet load binder, comprising:
   a tubular member having internal threads disposed in each of a pair of opposing open ends and a ratchet spur gear affixed to the tubular member for rotation of the tubular member in correspondence with rotation thereof;
   a ratchet handle pivotally coupled to the tubular member and configured to engage the ratchet spur gear for rotation thereof in a selected one of two opposing directions responsive to a reciprocative displacement of the ratchet handle about a longitudinal axis of the tubular member;
   a first attachment member having an axially extending threaded shaft portion disposed in one of the pair of opposing open ends of the tubular member and threadedly engaged with the internal threads thereof; and
   an attachment assembly disposed in the other of the pair of opposing open ends of the tubular member, the attachment assembly including:
      a second attachment member having an axially extended threaded shaft portion threadedly engaged with the internal threads of the other of the pair of opposing open ends of the tubular member, the threaded shaft portion of the second attachment member and the internal threads of the other of the pair of opposing open ends of the tubular member being configured to provide linear displacement of the second attachment member relative to the tubular member in common with the first attachment member; and
      a lever arm coupled to the second attachment member and configured to be held by one hand while a user's other hand reciprocates the ratchet handle, wherein the lever arm is movable between a first position substantially orthogonal to a longitudinal axis of the tubular member and a second position substantially parallel to the longitudinal axis of the tubular member.

17. The stabilized ratchet load binder as recited in claim 16, wherein the second attachment member includes a protruding tab extending therefrom and the lever arm is pivotally coupled to the protruding tab.

18. The stabilized ratchet load binder as recited in claim 16, wherein the lever arm has indicia positioned thereon for indicating a maximum extension of the second attachment member with respect to the tubular member of the ratchet load binder when the lever arm is reconfigured to a position substantially parallel to the longitudinal axis of the tubular member.

19. The stabilized ratchet load binder as recited in claim 1, wherein the lever arm is movable between a first position substantially orthogonal to the longitudinal axis of the tubular member and a second position substantially parallel to the longitudinal axis of the tubular member.

20. The stabilized attachment assembly as recited in claim 8, wherein the lever arm is movable between a first position substantially orthogonal to a longitudinal axis of the tubular member and a second position substantially parallel to the longitudinal axis of the tubular member.

21. A stabilized ratchet load binder, comprising:
   a tubular member having internal threads disposed in each of a pair of opposing open ends and a ratchet spur gear affixed to the tubular member for rotation of the tubular member in correspondence with rotation thereof;
   a ratchet handle pivotally coupled to the tubular member and configured to engage the ratchet spur gear for rotation thereof in a selected one of two opposing directions responsive to a reciprocative displacement of the ratchet handle about a longitudinal axis of the tubular member;
   a first attachment member having an axially extending threaded shaft portion disposed in one of the pair of opposing open ends of the tubular member and threadedly engaged with the internal threads thereof; and
   an attachment assembly disposed in the other of the pair of opposing open ends of the tubular member, the attachment assembly including:
   a second attachment member having an axially extended threaded shaft portion threadedly engaged with the internal threads of the other of the pair of opposing open ends of the tubular member, the threaded shaft portion of the second attachment member and the internal threads of the other of the pair of opposing open ends of the tubular member being configured to provide linear displacement of the second attachment member relative to the tubular member in common with the first attachment member; and a lever arm coupled to the second attachment member and configured to be held by one hand while a user's other hand reciprocates the ratchet handle, wherein the lever arm is reconfigurablely coupled to the second attachment member, and wherein the lever arm has indicia positioned thereon for indicating a maximum extension of the second attachment member with respect to the tubular member of the ratchet load binder when the lever arm is reconfigured to a position substantially parallel to the longitudinal axis of the tubular member.

* * * * *